Figure 1:
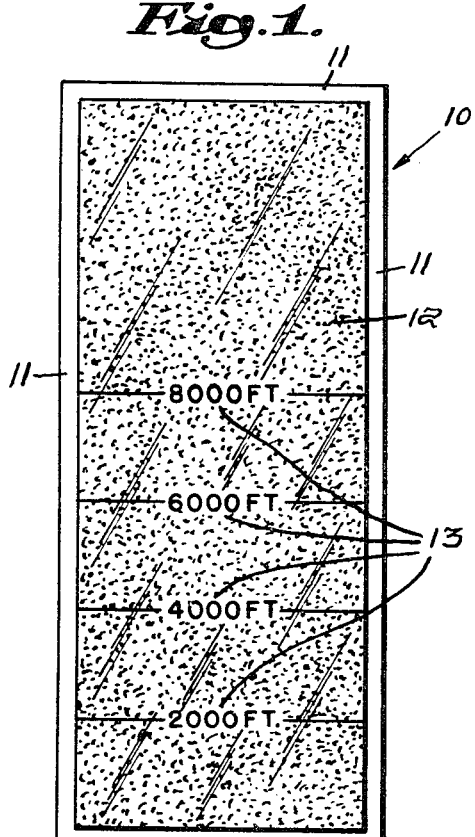

United States Patent

[11] 3,632,355

[72] Inventors Anthony P. Umina
 Hopkinton;
 Donald E. Westcott, Acton, both of Mass.
[21] Appl. No. 46,672
[22] Filed June 16, 1970
[45] Patented Jan. 4, 1972
[73] Assignee The United States of America as
 represented by the Secretary of the Army

[54] METHOD OF CONTROLLING LEAVENING IN A BAKERY MIX AT VARYING ELEVATIONS
7 Claims, 3 Drawing Figs.
[52] U.S. Cl. ................................................... 99/86
[51] Int. Cl. ................................................... A21d 8/00,
 A23p 1/00
[50] Field of Search ........................................... 107/54 R,
 54 B; 99/86, 90, 168, 171, 172, 181

[56] References Cited
UNITED STATES PATENTS
2,478,618 8/1949 Armstrong et al. ............ 107/54 B X
3,057,730 10/1962 Morck ........................... 107/54 R X
3,077,262 2/1963 Gaste ............................ 99/171 CPD X Primary Examiner—Richard J. Scanlan, Jr.
Attorneys—Harry M. Saragovitz, Edward J. Kelly, Herbert Berl and Charles C. Rainey ABSTRACT: Method of controlling leavening a bakery mix to be used at various elevations comprising packaging all of one of the ingredients (preferably sodium bicarbonate) which produce leavening in a separate package from that containing the remaining ingredients of the bakery mix, the package containing this one ingredient being provided with indicia at various levels along one face thereof indicating where the package should be cut to separate the contents into two portions, one portion to be discarded while the other portion containing the proper amount of sodium bicarbonate or other leavening ingredient for a selected elevation is added to the remaining ingredients of the bakery mix at the selected elevation and converted into a bakery product in a conventional manner.

PATENTED JAN 4 1972          3,632,355

Inventors:
Anthony P. Umina,
Donald E. Westcott,
by: Harry M. Saragovitz,
Edward J. Kelly, Herbert Berl &
Charles C. Rainy
Attorneys

METHOD OF CONTROLLING LEAVENING IN A BAKERY MIX AT VARYING ELEVATIONS

The invention described herein may be manufactured, used, and licensed by or for the Government for governmental purposes without the payment to us of any royalty thereon.

This invention relates to a method of controlling the leavening of a bakery mix of the type which employs an edible bicarbonate, such as sodium bicarbonate, as the source of carbon dioxide gas for leavening purposes. More particularly, the invention relates to a method of controlling the leavening of such bakery mixes at various elevations above sea level.

The leavening of bakery products is generally accomplished by the formation of a gas in the dough or batter matrix and expansion of bubbles or small pockets filled with the gas. To obtain good texture in the bakery product, it is important for the individual gas bubbles to be kept separated as much as possible in the matrix during the baking of the product which is accompanied by expansion of the gas bubbles as well as the entire mass of dough and final baked product.

The most commonly used gas for leavening is carbon dioxide and the most frequently employed source of the carbon dioxide is sodium bicarbonate. Various acids or acid-producing materials are used to react with the sodium bicarbonate and release the carbon dioxide therefrom.

In the manufacture of bakery mixes, it has been found that sodium bicarbonate is very susceptible to reaction with any moisture present in the mix ingredients with resultant premature loss of carbon dioxide. Consequently, efforts to improve the shelf life or storage stability of bakery mixes have revolved around methods of keeping the sodium bicarbonate isolated from the other ingredients of a mix in order to avoid moisture pickup and losses of carbon dioxide resulting therefrom and accompanying decreases in leavening action. Another method of accomplishing this purpose has been the use of large granules of sodium bicarbonate which are coated with shortening or other hydrophobic substances.

In preparing bakery mixes for use at various elevations above sea level, another problem occurs, namely that less leavening action is needed to produce a bakery product at a higher elevation than at sea level since the pressure of the atmosphere is less at the higher elevations. Consequently, if a bakery mix prepared for use at sea level is actually used at a higher elevation, its texture may be markedly different from the texture obtained at sea level. This texture difference is not very noticeable at low elevations; but it becomes increasingly apparent at elevations of 2,000 feet and up since the dough or batter expands to a greater extent because larger bubbles of the leavening gas are formed at the higher elevations. Consequently, it is important in the manufacture of bakery mixes which may be used not only at or near sea level but also at elevations of several thousand feet above sea level that provision be made for easily adjusting the degree of leavening of the bakery mixes as well as maintaining the leavening potential of the bakery mixes over relatively long storage periods.

It is, therefore, an object of the present invention to provide a method of controlling the leavening of a bakery mix at sea level and various elevations above sea level.

A further object is to provide a method of and package for controlling the leavening of a bakery mix of the type employing an edible bicarbonate, such as sodium bicarbonate, as the source of carbon dioxide gas for leavening purposes at sea level and various elevations above sea level.

Other objects and advantages will be apparent from the following description of the invention, and the novel features will be particularly pointed out hereinafter in connection with the appended claims.

In the accompanying drawing:

FIG. 1 is a plan view of a flexible film package or pouch in accordance with the invention containing the sodium bicarbonate for addition to a bakery mix containing all of the remaining ingredients of the complete bakery mix other than the sodium bicarbonate for use in preparing a bakery product and bearing indicia on one face thereof to facilitate carrying out the method of the invention.

Figure 2:
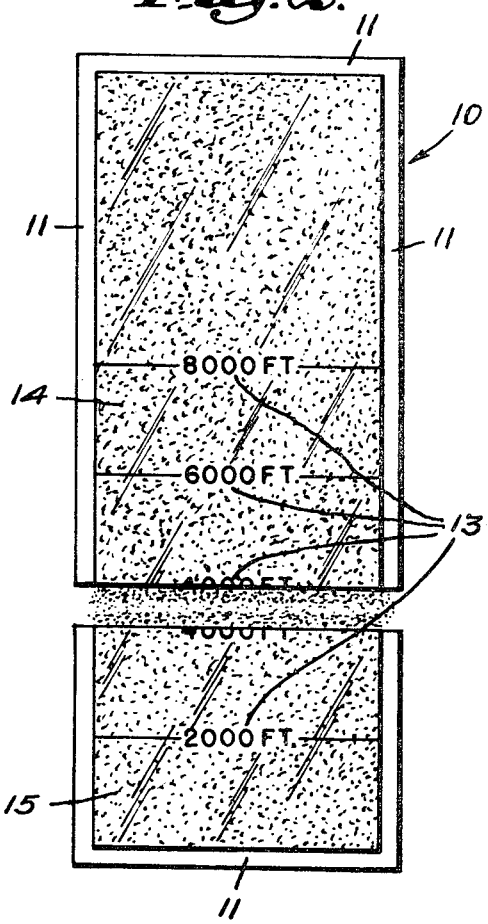

FIG. 2 is a plan view of the flexible film package of FIG. 1 which has been cut through along a plane passing through the package and the sodium bicarbonate contents thereof parallel to the 4,000 foot indicia and showing the sodium bicarbonate contents of the package separated into two portions, the lower portion of which is to be discarded and the upper portion employed in completing a bakery mix to be used at an elevation of 4,000 feet above sea level.

Figure 3:
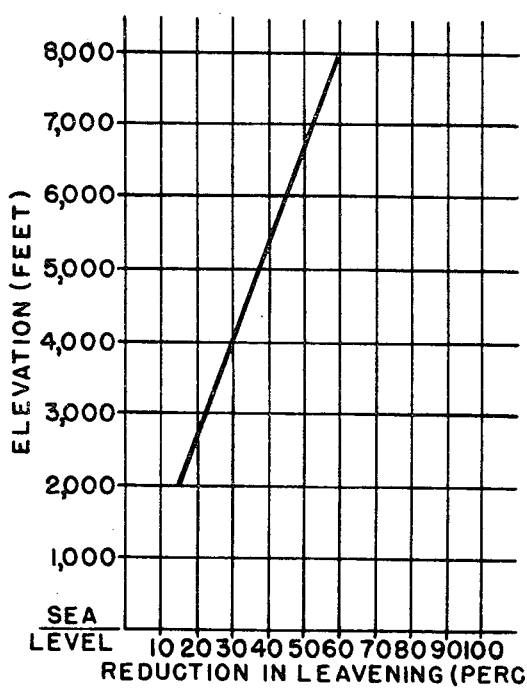

FIG. 3 is a graph showing the percentage reduction in leavening required at various elevations above sea level to produce substantially the same texture in a bakery product prepared from a given bakery mix designed for use at approximately sea level.

In FIG. 1, the flexible film package or pouch 10 is made of waterproof film, or of a laminate of film and foil which is waterproof and has hermetically sealed edges 11 along the sides and ends thereof. The sodium bicarbonate 12 contained within the flexible film package is in powder form and is substantially free of moisture. Each indicia 13 imprinted on a face of the flexible film package indicates the portion of the package which should be cut off so as to discard the sodium bicarbonate contained within that portion of the package lying below the indicia indicating the elevation at which the bakery mix is to be used. When the cut through the package is made along a plane parallel to the selected indicia, as shown in FIG. 2, the portion 14 of the sodium bicarbonate remaining after discard of the lower portion of sodium bicarbonate 15 is retained for the purpose of mixing it in the dry state with the remaining ingredients of the bakery mix taken from a separate package (not shown).

FIG. 3 provides the basis for determining the approximate location of the indicia on the flexible film package 10 of FIG. 2 since the percent reduction of leavening attained will be controlled by the percent of the sodium bicarbonate discarded from the quantity thereof required for proper leavening at sea level.

It is to be understood that for the purposes of this application, the term "baking dough" is intended to include batters as well as the more viscous mixtures conventionally referred to as doughs.

An example of a bakery mix to which the present invention is applicable is the white cake mix composition shown in table 1.

Table 1

| Ingredient | Parts by Weight |
| --- | --- |
| Cake flour | 41.4 |
| Sugar | 43.0 |
| Shortening | 9.5 |
| Nonfat dry milk solids | 2.0 |
| Egg albumin, dehydrated | 1.5 |
| Salt | 0.75 |
| Sodium aluminum phosphate | 0.50 |
| Sodium bicarbonate | 0.50 |
| Monoglycerides | 0.40 |
| Sodium stearoyl-2-lactylate | 0.40 |
| Coated monocalcium phosphate | 0.05 |

The method of the invention is carried out by packaging the sodium bicarbonate without any of the other ingredients of the bakery mix in a flexible film package of the general type shown in FIG. 1 while all of the other ingredients of the bakery mix are contained in a separate package, the characteristics of which are in most respects immaterial, except that these ingredients should be protected against exposure to moisture until such time as they are to be purposely mixed with an aqueous fluid, preferably, though not necessarily, after having first been mixed in the dry state with the sodium bicarbonate, to produce a baking dough.

The procedure of carrying out the invention is to lay the hermetically sealed package containing the required amount of sodium bicarbonate for sea level baking out on a flat surface with the indicia on the upper surface, to shake and pat the package so as to distribute the sodium bicarbonate as evenly as possible throughout the package, then to cut along a selected elevation indicia, the indicia selected corresponding approximately to the elevation at which the bakery mix is to be used. The sodium bicarbonate below the cut along the selected elevation indicia is discarded and the sodium bicarbonate above the cut is mixed, preferably in the dry state, with the remaining ingredients of the bakery mix from the other package. When all of the ingredients have been thoroughly mixed in the dry state, water or an aqueous fluid is added in the proper amount and thoroughly mixed with the bakery mix to produce a baking dough, which is thereafter baked in an oven until a raised bakery product is produced.

If the bakery mix is to be used at an elevation of 2,000 feet above sea level, the package of sodium bicarbonate will be cut along the line of the 2,000 feet indicia on the package shown in FIG. 1. If it is to be used at an elevation of 4,000 feet above sea level, the package is cut along the line of the 4,000 feet indicia, as shown in FIG. 2. If it is to be used at elevations of 6,000 feet or 8,000 feet, the package is cut along the lines of the 6,000 feet or 8,000 feet indicia respectively. If desired, intermediate cuts between the imprinted indicia may be made for intermediate elevations, for example, for 3,000, 5,000 or 7,000 feet. In each case, the sodium bicarbonate in the package below the cut is discarded and the remaining sodium bicarbonate in the package above the cut is mixed in the dry state with the remaining ingredients of the bakery mix; then the complete bakery mix is mixed with water or an aqueous fluid to produce a baking dough, which is then baked to produce a raised bakery product.

The flexible film package 10 may be made of any of a large number of waterproof film materials. For example, polyethylene film has been found to be particularly suitable for this purpose. Also, laminates of films and metal foil, such as a laminate having aluminum foil sandwiched between a first layer of polyethylene and a second layer of polyolefin has been found to provide outstanding protection of the sodium bicarbonate against absorption of moisture and to be readily heat-sealable along the edges of the package when the polyethylene layers in the laminates are arranged face-to-face to allow heat sealing of polyethylene to polyethylene along the edges of the package. If long term storage is of little consequence, the flexible film package may be made of material which is not waterproof. It may even be made of water-soluble film material, such as carboxymethyl cellulose, if the bakery mix is to be used within a short time after packaging of the sodium bicarbonate.

It is to be understood that the invention is applicable to other bakery mix compositions than that described above, of which many have been developed for producing different types of bakery products.

It is also to be understood that the component of the complete bakery mix which is isolated from other components of the bakery mix may be other potential gas-liberating materials, such as other edible carbonates or bicarbonates, e.g., ammonium bicarbonate. It also may be the acid or acid-forming component of the bakery mix, if desired; although it is generally preferred that it be sodium bicarbonate, since this component when mixed with flour and other components of the bakery mix is particularly susceptible to change resulting from extraction of moisture from the flour or other components of the mix, and therefore, is more stable if packaged separately from all of the other components of the bakery mix in a waterproof package.

The invention provides effective control of the degree of leavening of a bakery mix. The leavening agents are maintained in stable condition for long periods of time. The method of measuring the amount of one of the leavening components is simple and is accurate enough to produce the desired leavening action for most bakery mixes and the bakery products produced therefrom. Any excess of the other leavening ingredient which is likely to be present in the bakery mix is insufficient to detract from the acceptability of the bakery product.

It will be understood, of course, that various changes in the details, materials and arrangements of parts which have been herein described and illustrated in order to explain the nature of the invention, may be made by those skilled in the art within the principle and scope of the invention.

We claim:

1. A method of controlling the leavening of a bakery mix of the type employing an edible bicarbonate as the source of carbon dioxide gas for leavening purposes at sea level and various elevations above sea level which comprises packaging substantially all of said edible bicarbonate in a first package, packaging the remaining ingredients of said bakery mix in a second package, said first package having a plurality of indicia imprinted on at least one face thereof, each of said indicia indicating an elevation above sea level to correspond with the amount of carbon dioxide obtainable from the edible bicarbonate in the portion of edible bicarbonate in said first package above each of said indicia which is required for optimum leavening of said remaining ingredients of said bakery mix at said elevation above sea level, separating the edible bicarbonate in said first package along a plane running through said package parallel to a selected indicia indicating the approximate elevation at which said bakery mix is to be used, discarding the portion of said edible bicarbonate in said first package below said plane, mixing the remainder of said edible bicarbonate in said first package with said remaining ingredients of said bakery mix in the dry state to produce a complete dry bakery mix, mixing aqueous fluid with said complete dry bakery mix in a quantity sufficient to produce a baking dough, and baking said baking dough sufficiently to transform said baking dough into a bakery product.

2. A method of controlling the leavening of a bakery mix of the type employing an edible bicarbonate as the source of carbon dioxide gas for leavening purposes at sea level and various elevations above sea level in accordance with claim 1, wherein said first package is sufficiently waterproof to protect said edible bicarbonate from pickup of moisture.

3. A method of controlling the leavening of a bakery mix of the type employing an edible bicarbonate as the source of carbon dioxide gas for leavening purposes at sea level and various elevations above sea level in accordance with claim 2, wherein said first package is made of substantially waterproof flexible film, said film being hermetically sealed to exclude moisture from said edible bicarbonate packaged therein.

4. A method of controlling the leavening of a bakery mix of the type employing an edible bicarbonate as the source of carbon dioxide gas for leavening purposes at sea level and various elevations above sea level in accordance with claim 1, wherein said indicia are graduated to correspond to intervals of approximately 2,000 feet of elevation above sea level between successive indicia.

5. A method of controlling the leavening of a bakery mix of the type employing an edible bicarbonate as the source of carbon dioxide gas for leavening purposes at sea level and various elevations above sea level in accordance with claim 3, wherein said indicia are graduated to correspond to intervals of approximately 2,000 feet of elevation above sea level between successive indicia.

6. A method of controlling the leavening of a bakery mix of the type employing an edible bicarbonate as the source of carbon dioxide gas for leavening purposes at sea level and various elevations above sea level in accordance with claim 1, wherein said step of separating said edible bicarbonate in said first package along a plane running through said package parallel to a selected indicia indicating the approximate elevation at which said bakery mix is to be used is carried out by cutting said package along said plane.

7. A method of controlling the leavening of a bakery mix of the type employing an edible bicarbonate as the source of carbon dioxide gas for leavening purposes at sea level and various elevations above sea level in accordance with claim 3, wherein said step of separating said edible bicarbonate in said first package along a plane running through said package parallel to a selected indicia indicating the approximate elevation at which said bakery mix is to be used is carried out by cutting said package along said plane.

* * * * *